United States Patent Office 3,081,298
Patented Mar. 12, 1963

3,081,298
NEW CYCLOHEMIACETALS AND CYCLOHEMI-
ACETAL ESTERS OF THE PREGNANE SERIES
AND A PROCESS FOR THEIR MANUFACTURE
Albert Wettstein, Riehen, and Julius Schmidlin, Basel,
Switzerland, assignors to Ciba Corporation, a corporation of Delaware
No Drawing. Filed Aug. 26, 1960, Ser. No. 52,023
Claims priority, application Switzerland Aug. 28, 1959
16 Claims. (Cl. 260—239.55)

The present invention provides a process for the manufacture of 18(21)-cyclosemiacetals and 18(21)-cyclosemiacetal esters of saturated and unsaturated 18:20-dioxo-21-hydroxy-pregnane compounds.

The present process consists in dehydrogenating a saturated or unsaturated 20-ketal of an 18:21-dihydroxy-20-oxo-pregnane containing in the 3-position a free or functionally converted hydroxyl or oxo group with a compound of hexavalent chromium, for example chromium trioxide, or with tertiary butyl chromate, in the presence of a diluent to obtain the 18(21)-cyclosemiacetal of a 20-ketalized 18-oxo-21-hydroxy-20-keto-pregnane; hydrolysing in the resulting dehydrogenation product the ketal group in the 20-position by treatment with a strong inorganic acid in the presence of a lower aliphatic carboxylic acid; if desired esterifying the 18(21)-cyclosemiacetal group prior to the ketal cleavage; hydrolysing ester groups after cleavage of the ketal, and if desired again esterifying free hydroxyl groups or ketalizing free oxo groups.

The starting materials are known or can be made by known methods. Apart from the substituent in the 3-position they may contain further substituents, more especially a free or esterified hydroxyl or oxo group, for example in the 11-position. Furthermore, they may contain double bonds, for example starting from carbon atom 5. Starting materials that contain an additional hydroxyl group in the 11β-position are obtained, for example, by the process described in patent application Serial No. 845,095, filed October 8, 1959, by Albert Wettstein et al. from suitable 20-ketals of (18→ 11)-lactones of 11β:21-dihydroxy-20-oxo-pregnane-18-acids by reduction with a complex metal hydride. By partial dehydrogenation of the resulting 11β:18:21-trihydroxy-pregnane in the 11-position by means of a stoichiometric proportion of chromium trioxide in pyridine, a starting material containing an 11-oxo group is formed. A starting material containing a hydroxyl group in the 11α-position can be prepared from the latter product by reducing the 11-oxo-group with an alkali metal in ammonia+isopropanol.

The diluent to be used preferably in the dehydrogenation according to the invention with chromic acid anhydride is a tertiary amine, such as pyridine, with or without addition of water. A diluent suitable for use in the dehydrogenation with tertiary butyl chromate is above all a halogenated hydrocarbon, such as carbon tetrachloride or chloroform, advantageously in the presence of a small amount of tertiary butanol.

The very different behaviour of the two hydroxyl groups in 18- and 21-position during the dehydrogenation is surprising. While it was known that secondary hydroxyl groups in pregnane compounds containing a ketalized α-ketol side-chain can be dehydrogenated to yield ketones without affecting the 21-hydroxyl group, it could not have been expected that in the case of the starting materials to be used in the present process the primary 18-hydroxyl group, in the presence of the likewise primary 21-hydroxyl group, could be selectively dehydrogenated to yield the oxo stage. It is particularly advantageous to perform the oxidation in 18-position with an excess of oxidizing agent, for example with 5 to 50 molecular equivalents of chromium trioxide in pyridine, preferably at a temperature between +20 to +80° C. Starting from 20-ketals of 11β:18:21-trihydroxy-pregnane compounds, the corresponding 11:18-dioxo-steroids are obtained directly under the above reaction conditions. Alternatively, the two hydroxyl groups may be dehydrogenated in stages by the use of slightly more oxidant than the quantity calculated for one hydroxyl group, e.g. 1.0–1.3 molecular equivalents of chromium trioxide in pyridine and, in a second stage, by the use of an excess of oxidant.

Special measures are required to eliminate the ketal group in the 20-position. While it is possible to hydrolyse the ketal group in the 3-position of a dehydrogenation product without difficulty by one of the known methods, for example with hydrochloric acid in aqueous tetrahydrofuran or with acetic acid, these reagents fail in the case of a 20-ketal. Under normal conditions no cleavage is possible in this case; when the hydrolysis is forced by applying more energetic reaction conditions, undesirable side-reactions occur. It is, however, remarkable that the de-ketalization in the 20-position can be brought about in a mild manner and with a practically quantitative yield by treating the ketal to be split with a strong inorganic acid, such as perchloric acid, in the presence of a lower aliphatic carboxylic acid, such as acetic acid or propionic acid, preferably at a temperature ranging from −20° to +40° C.

The 18(21)-cyclosemiacetal of the 18-oxo-20:20-alkylene-dioxy-21-hydroxy-pregnane resulting from the dehydrogenation can, if desired, be acylated prior to the ketal cleavage, by a known method, for example by reaction with a lower carboxylic acid anhydride in the presence of a tertiary amine to form the corresponding 18(21)-cyclosemiacetal ester.

If the 18(21)-cyclosemiacetal ester of the 18:20-dioxo-21-hydroxy-pregnane resulting from the de-ketalization is to be hydrolyzed, this can be carried out with the use of an acid agent or an alkaline agent. Suitable acid agents are mineral acids such as hydrochloric acid or perchloric acid in an aqueous organic solvent, for example in aqueous dioxane or tetrahydrofuran. Acid hydrolysis offers special advantages when additionally present ester groups are to remain unaffected, for example an ester group in the 3-position. Alkaline agents suitable for use in the hydrolysis according to the process of the invention are weak bases, above all a solution of a carbonate or bicarbonate of an alkali metal in an aqueous diluent, such as an aqueous alcohol, for example in aqueous methanol or ethanol.

To prepare an 18(21)-cyclosemiacetal ester other than those which are formed directly, the free 18(21)-cyclosemiacetal obtained by hydrolysis can subsequently be esterified again by a known method. Suitable esterification agents are simple or mixed anhydrides or halides of aliphatic, alicyclic, araliphatic, aromatic or heterocyclic carboxylic, thionocarboxylic or thiolcarboxylic acids, especially those containing 1–20 carbon atoms, for example those of formic acid, acetic acid, halogenacetic acids, propionic acid, butyric acids, valeric acids, caproic acids, oenanthic acids, caprylic acids, palmitic acids, crotonic acid, undecanoic acid, undecylenic acids, ocalic acid, succinic acid, pimilic acid, maleic acid, lactic acid, carbamic acids, alkoxycarboxylic acids, β-cyclopentyl-propionic acid, hexahydrobenzoic acid, benzoic acid, phenylacetic acid, cyclohexylacetic acid, phenylpropionic acids, trimethylgallic acid, phthalic acid, tetrahydrophthalic acid, furan-2-carboxylic acid and isonicotinic acid.

The products of the present invention are new, and some of them are therapeutically useful substances displaying an adrenocortical action. Thus, for example, the 18(21)-cyclosemiacetal of 11:18-dioxo-cortexone and its 18(21)-cyclosemiacetal esters possess an action similar to that of aldosterone. In addition, the products obtained by the present process are valuable intermediates or starting materials for the manufacture of other 18-oxygenated corticosteroids acting as suprarenal hormones. Thus, for example, the 18(21)-cyclosemiacetal of 11:18-dioxo-cortexone can be converted into d:l-21-O-acetylaldosterone or into the d:l-aldosterone by the reaction represented by the following formulae:

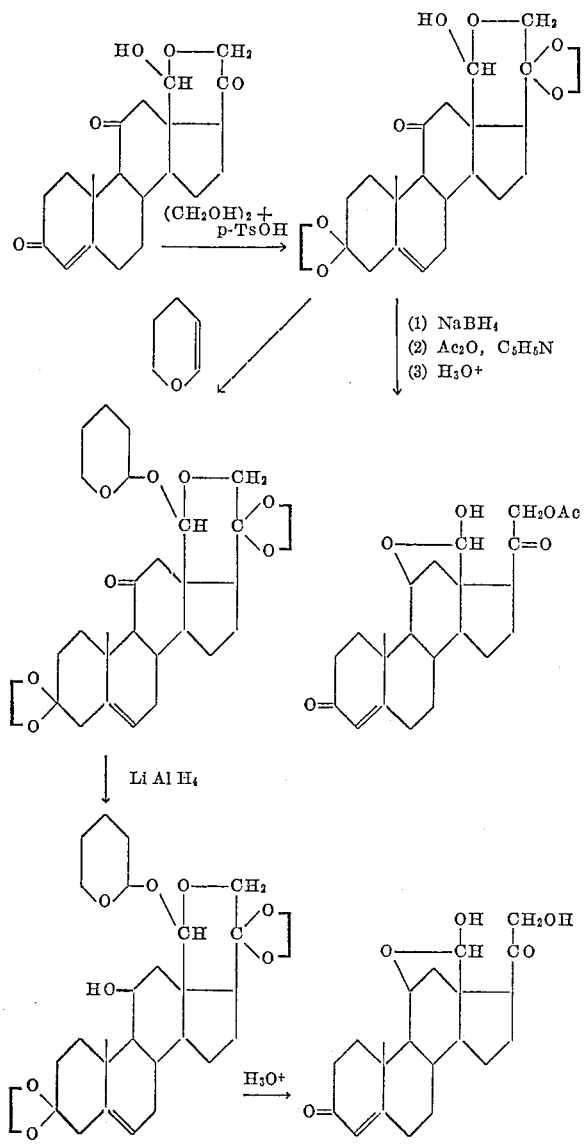

The invention further includes any variant of the process in which an intermediate obtained at any stage of the process is used as starting material and the remaining step or steps is/are carried out, or the process is terminated at any stage thereof, or the starting materials are formed under the reaction conditions.

The new compounds can be used as medicaments in human and veterinary medicine, for example in the form of mixtures of substances which contain the active substance in admixture with a pharmaceutical organic or inorganic, solid or liquid carrier suitable for enteral or parenteral administration. As carriers such substances come into consideration as do not react with the new compounds, such as for instance water, gelatine, lactose, starch, magnesium stearate, talc, vegetable oils, benzyl-alcohols, gums, polyalkylene glycols, cholesterol or other known carriers. The pharmaceutical preparations can be in the form, for instance, of tablets or dragees or in liquid form as solutions, suspensions or emulsions. They may be sterilized and/or contain auxiliary substances, such as preserving, stabilizing, wetting or emulsifying agents, salts for the modification of osmotic pressure or buffers. They may also contain other therapeutically useful substances. The preparations are obtained in the customary way. The content of active substance in these preparations, such as in an ampoule, is preferably 0.1–200 mg., or 0.03–60%.

The following examples illustrate the invention.

*Example 1*

A solution of 1.069 grams of d:l-$\Delta^5$-3:3:20:20-bis-ethylenedioxy-11$\beta$:18:21-trihydroxy-pregnene in 10 cc. of pyridine is treated with 50 cc. of a 0.2-molar solution of chromium trioxide in pyridine, and the whole is stirred for 20 hours at room temperature. The pyridine is then almost completely removed by means of an oil pump, and the residue to repeatedly extracted by digestion with methylene chloride. The insoluble inorganic matter is filtered off the extracts and the filtrate is washed ice-cold with 1.5 N-phosphoric acid, 0.5 N-sodium bicarbonate solution and water, dried over sodium sulfate and evaporated. To purify the residue it is dissolved in 150 cc. of tetrahydrofuran, the solution is filtered through a column of 2.5 grams of active carbon, and the filtrate is evaporated in vacuo. The resulting crude product (883 mg.) is dissolved in 45 cc. of methylene chloride, the solution is poured over 450 sheets of Whatman paper No. 1 (size: 18.5 x 45 cm.) saturated with formamide and chromatography "to the bottom" is performed with the system formamide/benzene. The sheets are dried for 16 hours in a high vacuum and the main zone of $R_f$=0.30 to 0.60 is eluted with 6600 cc. of aqueous tetrahydrofuran of 20% strength and then with 3000 cc. of aqueous tetrahydrofuran of 50% strength, the extract is concentrated in vacuo to a volume of 50 cc. and the aqueous residue is saturated with sodium chloride and then exhaustively extracted with benzene. The benzolic extracts are washed with a small amount of 2.5 molar sodium chloride solution, combined, dried over sodium sulfate and evaporated, to yield 717 mg. of a crystalline eluate which is dissolved in 65 cc. of tetrahydrofuran and decolorized by filtration through 1.44 grams of active carbon. The filtrate is evaporated in vacuo, and the residue is recrystallized from ether to yield 408 mg. of the 18-cyclosemiacetal of d:l - $\Delta^5$ - 3:3:20:20-bis-ethylenedioxy-11:18-dioxo-21-hydroxypregnene melting at 250–253° C. with slight decomposition.

A solution of 111.2 mg. of the 18-cyclosemiacetal of d:l-$\Delta^5$-3:3:20:20-bis-ethylenedioxy-11:18 - dioxo - 21-hydroxypregnene in 17.1 cc. of dioxane is treated with 1.9 cc. of N-hydrochloric acid, and the mixture is kept for 64 hours in the dark at room temperature. The reaction solution is then neutralized with 9.5 cc. of 0.2 N-sodium bicarbonate solution, the dioxane is removed by concentration under reduced pressure, and the aqueous concentrate is extracted with methylene chloride. The extracts are washed with 2.5 molar sodium chloride solution, combined, dried over sodium sulfate and evaporated. Recrystallization of the residue from acetone yields 91.2 mg. of the 18-cyclosemiacetal of d:l-$\Delta^4$-3:11:18-trioxo-20:20 - ethylenedioxy - 21 - hydroxy - pregnene melting at 262–265° C. while turning brown.

70.1 mg. of the 18-cyclosemiacetal of d:l-$\Delta^4$-3:11:18-trioxo-20:20-ethylenedioxy - 21 - hydroxy-pregnene in 2.8 cc. of pyridine are acetylated with 1.65 cc. of acetanhydride for 64 hours at room temperature. The assistants and the acetic acid formed are then removed by means of an oil pump and the retained residual matter is removed with the aid of toluene as entraining agent. On recrystallization from a mixture of acetone and ether (abt. 1:10) the residue yields 69.1 mg. of d:l-$\Delta^4$-3:11-dioxo-18-acetoxy-18:21-oxido-20:20-ethylene-dioxy-pregnene melting at 265–272° C. while turning brown.

22.3 mg. of d:l-$\Delta^4$-3:11-dioxo-18-acetoxy-18:21-oxido-

20:20-ethylenedioxy-pregnene are dissolved by being agitated with 2.0 cc. of 1-molar perchloric acid dihydrate+ glacial acetic acid mixture. Afetr 10 minutes, the reaction mixture is cooled with ice-cold water and treated with 1.5 cc. of ice-cold 2 molar sodium acetate solution, and the whole is evaporated almost to dryness under a high vacuum. The residue is treated with water, extracted with methylene chloride, the extract is washed with ice-cold 0.2 N-sodium bicarbonate solution and with 2.5 molar sodium chloride solution, dried over sodium sulfate, and the solvent is distilled off under reduced pressure. The resulting crude product yields from acetone+ether 15.9 mg. of a crystallizate melting at 176–195° C. which is recrystallized from ethyl acetate with methylene chloride as solution promoter. Yield: 9.6 mg. of d:1-$\Delta^4$-3:11:20-trioxo-18-acetoxy - 18:21 - oxido-pregnene melting at 198–206° C.

A solution of 10.0 mg. of d:1-$\Delta^4$-3:11:20-trioxo-18-acetoxy-18:21-oxido-pregnene in 1.125 cc. of tetrahydrofuran is mixed with 0.125 cc. of N-hydrochloric acid, and the whole is kept for 64 hours at room temperature. The reaction mixture is then cooled in ice water, treated with 1.25 cc. of 0.1 N-sodium bicarbonate solution and 1 cc. of water and then freed from tetrahydrofuran in vacuo. The aqueous residue is saturated with sodium chloride and extracted with methylene chloride, the extracts are washed with 4 molar sodium chloride solution, combined, dried over sodium sulfate, and the solvent is distilled off in vacuo. The resulting crude product is purified by being dissolved in 0.9 cc. of methylene chloride, poured over 9 sheets of Whatman paper No. 1 (size 18.5 x 45 cm.; previously washed with chloroform and methanol) saturated with formamide, and chromatographed in the system formamide/benzene-chloroform (1:3) "down to the bottom." The ultraviolet-absorbing zone of $R_f$ value =0.275 to 0.425 is dried for 14 hours in an aerated fume cupboard, eluted with 200 cc. of aqueous tetrahydrofuran of 20% strength, 80 cc. of 50% strength and 40 cc. of undiluted tetrahydrofuran, the combined extracts are concentrated to a volume of 5 cc., and the aqueous residue is saturated with sodium chloride and then extracted by agitation with benzene. The extracts are washed with a small amount of 4 molar sodium chloride solution, the combined benzolic solutions are dried over sodium sulfate, and the solution is evaporated in vacuo. The crude product is dissolved in 1 cc. of tetrahydrofuran, the solution is decolorized by filtration through a column of 20 mg. of active carbon, the filtrate is concentrated to syrup consistency in vacuo, and the concentrate is cautiously diluted with ether. On being allowed to stand, 1.33 mg. of the 18-cyclosemiacetal of d:1-$\Delta^4$-3:11:18:20-tetraoxo-21-hydroxy-pregnene, melting at 192–194.5° C., crystallize out. A solution of 1.26 mg. of the 18-cyclosemiacetal of d:1-$\Delta^4$-3:11:18:20-tetraoxo - 21 - hydroxy-pregnene in 0.015 cc. of pyridine and 0.035 cc. of acetic anhydride is allowed to stand at room temperature for 18 hours, then evaporated under a high vacuum with the addition of a total of 0.4 cc. of toluene, and the residual toluene is finally removed in vacuo while adding ethyl acetate. The solution is concentrated to a great extent and allowed to stand. 0.78 mg. of d:1-$\Delta^4$-3:11:20-trioxo-18-acetoxy-18:21-oxido-pregnene of melting point 189–198.5° C. separate out.

The 18-cyclosemiacetal of d:1-$\Delta^4$-3:11:18:20-tetraoxo-21-hydroxy-pregnene obtained in the above example can be converted into d:1-21-O-acetyl-aldosterone in the following manner:

A solution of 35.9 mg. of the 18-cyclosemiacetal of d:1-$\Delta^4$-3:11:18:20-tetraoxo-21-hydroxy-pregnene in 5.0 cc. of ethylene glycol containing 2 mg. of para-toluenesulfonic acid is heated for 1 hour in a water-jet vacuum in a bath maintained at 85–90° C. The ethylene glycol is then distilled off at the same temperature in an oil-pump vacuum until a small amount of residue remains which is treated with 1 cc. of 0.02 N-sodium bicarbonate solution and with 4 molar sodium chloride solution, and the whole is repeatedly agitated with methylene chloride. The extracts are washed with 4 molar sodium chloride solution, combined, dried over sodium sulfate and evaporated to yield the crude 18-cyclosemiacetal of d:1-$\Delta^5$-3:3:20:20-bis-ethylenedioxy-11:18-dioxo-21-hydroxy-pregnene. The resulting amorphous residue is dissolved in 4 cc. of methanol, the solution is cooled to 0–3° C., treated with 1.0 cc. of a 0.1 molar solution of sodium borohydride in methanol and stirred for 14 hours while being cooled with ice. 1.0 cc. of 0.1 N-acetic acid and 2.5 cc. of water are then added, the solution is concentrated in vacuo to a volume of about 2.5 cc. and extracted with methylene chloride. The extracts are washed with ice-cold 0.1 N-sodium bicarbonate and 4 molar sodium chloride solution, dried over sodium sulfate and evaporated. The yellowish, resinous residue is the crude 18-cyclosemiacetal of d:1-$\Delta^5$-3:3:20:20-bis-ethylenedioxy-11$\beta$:21-dihydroxy-18-oxo-pregnene. The reduction product obtained in this manner is dissolved in 0.80 cc. of pyridine, the solution is mixed with 0.48 cc. of acetanhydride and kept for 14 hours at room temperature. The reaction mixture is then evaporated in a high vacuum, and remaining residues of reagents are removed by dissolving the whole in toluene and repeatedly evaporating the solutions. The final deketalization is carried out by dissolving the resulting acetylation product in 2.5 cc. of acetic acid of 90% strength, and maintaining the solution for 30 minutes at a gentle boil. The acetic acid is then completely evaporated with the aid of an oil pump and with the use of toluene as entraining medium, and the crude product is chromatographically separated on 10 sheets of Whatman paper No. 1 (size 18.5 x 45 cm.; previously washed with chloroform and methanol) saturated with formamide, in the system formamide/cyclohexane-benzene (1:2). The chromatogram is allowed to "run to the bottom," dried for 14 hours in a high vacuum, and the ultraviolet-absorbing zone of $R_f$=0.08 to 0.16 is eluted by means of aqueous tetrahydrofuran, first of 20% and then of 50% strength; the combined extracts are freed from tetrahydrofuran by evaporation in vacuo, and the aqueous residue is saturated with sodium chloride and then extracted with benzene. The benzolic extract is dried over sodium sulfate and evaporated in vacuo, to yield a yellowish residue which crystallizes from a small amount of acetone on addition of ether, to yield 6.7 mg. of d:1-21-O-acetyl-aldosterone melting at 178–180° C.

*Example 2*

90.2 mg. of d:1-$\Delta^5$-3:3:20:20-bis-ethylenedioxy-11-oxo-18:21-dihydroxy-pregnene are oxidized in 2.0 cc. of pyridine with 5 cc. of a 0.2 molar solution of chromium trioxide in pyridine for 24 hours at room temperature. The reaction mixture is then worked up as described in the first paragraph of Example 1, and the crude product is purified by paper-chromatography as described in that example. Yield: 44.6 mg. of the 18-cyclosemiacetal of d:1-$\Delta^5$-3:3:20:20-bis-ethylenedioxy-11:18-dioxo - 21 - hydroxy-pregnene melting at 250 to 253° C. with slight decomposition.

Instead of chromium (VI)-oxide in pyridine, there can be used for this oxidation tertiary butyl chromate in carbon tetrachloride with the addition of 10 mol percent of tertiary butanol.

11.2 mg. of the 18-cyclosemiacetal of d:1-$\Delta^5$-3:3:20:20-bis-ethylenedioxy-11:18-dioxo-21-hydroxy-pregnene are dissolved in 1 cc. of a 1 molar mixture of perchloric acid dihydrate+glacial acetic acid, and the whole is kept for 10 minutes at room temperature in the dark. While cooling externally with ice water, 0.75 cc. of 2 N-sodium acetate solution is added, and the mixture is evaporated almost to dryness in a high vacuum. The residue is treated with water and extracted with methylene chloride, the extract is washed with ice-cold 0.2 N-sodium bicarbonate solution and with 2.5 molar sodium chloride solution, dried over sodium sulfate, and the solvent is distilled off in vacuo. The crude product obtained in this manner crystallizes from acetone+ether. Yield: 7.65 mg. of crystals melting at 180–196.5° C. which, on re-crystallization from tetrahydrofuran+ether, yield 5.15 mg. of d:l-$\Delta^4$-3:11:20-trioxo-18-acetoxy-18:21-oxido-pregnene melting at 198–206° C.

10.1 mg. of d:l-$\Delta^4$-3:11:20-trioxo-18-acetoxy-18:21-oxido-pregnene are dissolved in 4.5 cc. of methanol of 90% strength, 0.5 cc. of a 0.1 N-solution of potassium carbonate in methanol of 90% strength is added under nitrogen, and the mixture is allowed to react for 3 minutes. A piece of solid carbon dioxide of the size of a grain of rice is then added, and the reaction mixture is evaporated to dryness in an oil pump vacuum. The residue is mixed with 150 mg. of sodium sulfate and repeatedly extracted with methylene chloride, the extracts are combined, filtered, and concentrated to a volume of 0.8 cc. and chromatographed "down to the bottom" at 38° C. on 8 sheets of Whatman paper No. 1 (size: 18.5 x 45 cm.; previously washed with chloroform and methanol) saturated with formamide, in the system formamide/benzene-chloroform (1:2). After drying for 14 hours in a smoke cupboard, the ultra-violet-absorbing zone of $R_f$=0.38 to 0.55 is eluted with 150 cc. of aqueous tetrahydrofuran of 20% strength, 60 cc. of 50% strength and 30 cc. of undiluted tetrahydrofuran, the extracts are combined and concentrated in vacuo to a volume of 5 cc., and the aqueous residue is saturated with sodium chloride and exhaustively extracted with benzene. The benzolic extracts are washed with a small amount of 4 molar sodium chloride solution, combined, dried over sodium sulfate, and the solvent is distilled off in vacuo. The crude eluate is dissolved in 1 cc. of tetrahydrofuran, the solution is filtered through a column of 20 mg. of active carbon, and the filtrate is concentrated to syrup consistency in vacuo. When a small amount of ether is added and the whole is allowed to stand for some time, 1.3 mg. of the 18-cyclosemiacetal of d:l-$\Delta^4$-3:11:18:20-tetraoxo-21-hydroxy-pregnene, melting at 194.5 to 197.5° C., crystallize out.

The starting material used in the above example can be made in the following manner:

A solution of 129.9 mg. of d:l-$\Delta^5$-3:3:20:20-bis-ethylene-dioxy-11$\beta$:18:21-trihydroxy-pregnene in 4.15 cc. of pyridine is treated with 3.4 cc. of a 0.1 molar solution of chromium trioxide in pyridine, and the mixture is stirred for 22 hours at room temperature. The pyridine is then removed almost completely in an oil-pump vacuum, and the residue is extracted by repeated digestion with methylene chloride. The extracts are freed from insoluble inorganic matter by filtration, washed with ice-cold 1.5 N-phosphoric acid, 0.5 N-sodium bicarbonate solution and with water, dried over sodium sulfate and evaporated. For purification the residue is dissolved in 2.5 cc. of tetrahydrofuran, the solution is filtered through a column of 250 mg. of active carbon, and the filtrate is evaporated in vacuo. The resulting crude products is recrystallized from acetone+ether, to yield 94.5 mg. of d:l-$\Delta^5$-3:3:20:20-bis-ethylenedioxy-11-oxo-18,21-dihydroxy-pregnene melting at 169.5 to 172.5° C.

By a 16 hour hydrolysis with 0.05 N-hydrochloric acid in aqueous tetrahydrofuran of 90% strength there is obtained from the above bis-ketal the d:l-$\Delta^4$-3:11-dioxo-18:21-dihydroxy-20:20-ethylenedioxy-pregnene.

The 18-cyclosemiacetal of d:l-$\Delta^5$-3:3:20:20-bis-ethylenedioxy-11:18-dioxo-21-hydroxy-pregnene can be converted into d:l-aldosterone as follows:

A mixture of 10 cc. of dry benzene, 0.088 cc. of pyridine, 0.040 cc. of anhydrous methanol, and 0.070 cc. of acetyl chloride is stirred for 15 minutes before 44.7 mg. of the 18-cyclosemiacetal of d:l-$\Delta^5$-3:3:20:20-bis-ethylenedioxy-11:18-dioxo-21-hydroxy-pregnene and 10 cc. of dihydropyrane are added. The mixture is stirred for 112 hours at 25° C. with the exclusion of moisture, then diluted with benzene, washed with 0.5 N-sodium bicarbonate and water, dried with sodium sulfate, and evaporated under reduced pressure. The residue is d:l-$\Delta^5$-3:3:20:20-bis-ethylenedioxy-11 - oxo - 18 - tetrahydropyranyloxy-18:21-oxido-pregnene. The crude product is dissolved in 4.0 cc. of anhydrous tetrahydrofuran, there is added 0.31 cc. of an 0.65 molar solution of lithium aluminum hydride in tetrahydrofuran, and the whole stirred for 24 hours at 20° C. At 0–3° C., the reaction mixture is then decomposed in turn with 0.50 cc. of molar ethyl acetate in tetrahydrofuran and 0.40 cc. of 2 molar water in tetrahydrofuran, and after the addition of 100 mg. of Hyflo-Supercel (registered trademark) the suspension is filtered off the inorganic material. The filtrate is evaporated and a nearly colorless residue obtained which is the d:l-$\Delta^5$-3:3:20:20-bis-ethylenedioxy-11$\beta$-hydroxy-18-tetrahydropyraniloxy-18:21-oxido-pregnene. To split off the protective groups, the crude reduction product is hydrolyzed for 16 hours under an atmosphere of nitrogen with 2.5 cc. of 0.1 molar hydrogen chloride in 90% aqueous tetrahydrofuran. The solution is then treated with 0.5 cc. of 0.5 N-sodium bicarbonate, evaporated under reduced pressure, the residue treated with 100 mg. of anhydrous sodium sulfate and extracted with acetone, the extract concentrated and separated chromatographically on 10 sheets of No. 1 Whatman paper (18.5 by 45 cm.; pre-washed with chloroform and methanol) using the solvent system C according to Bush. Eluation of the UV-absorbing zone which strongly reduces tetrazolium blue, $R_f$ value 0.30–0.45, with tetrahydrofuran and crystallization of the eluate from a mixture of acetone and ether yields pure d:l-aldosterone of melting point 168–172° C.

What is claimed is:

1. Process for the manufacture of 18(21)-cyclohemiacetals of 18:20-dioxo-21-hydroxy-pregnane compounds, wherein a member selected from the group consisting of saturated and unsaturated 20-ketals of 18:21-dihydroxy-20-oxo-pregnanes, which contain in the 3-position a member selected from the group consisting of a free-, an esterified- and an etherified hydroxyl group, a free-, an enolized- and a ketalized oxo group, is dehydrogenated with a compound of hexavalent chromium in the presence of a diluent to obtain the 18(21)-cyclohemiacetal of a 20-ketalized-18-oxo-21-hydroxy-20-keto pregnane, and in the resulting dehydrogenation product the ketal group in the 20-position is hydrolysed by treatment with a strong oxygen-containing inorganic acid in the presence of a lower aliphatic carboxylic acid.

2. Process for the manufacture of 18(21)-cyclohemiacetals and 18(21)-cyclohemiacetal esters of 18:20-dioxo-21-hydroxy-pregnane compounds, wherein a member selected from the group consisting of saturated and unsaturated 20-ketals of 18:21-dihydroxy-20-oxo-pregnanes, which contain in the 3-position a member selected from the group consisting of a free-, an esterified- and an etherified hydroxyl group, a free-, an enolized- and a ketalized oxo group, is dehydrogenated with a compound of hexavalent chromium in the presence of a diluent to obtain the 18(21)-cyclohemiacetal of a 20-ketalized 18-oxo-21-hydroxy-20-keto-pregnane, in the resulting dehydrogenation product the ketal group in the 20-position is hydrolyzed by treatment with a strong oxygen-containing inorganic acid in the presence of a lower aliphatic carboxylic acid and the 18(21)-cyclohemiacetal group is esterified prior to the ketal cleavage.

3. Process as claimed in claim 1, wherein as dehydrogenating agent chromium trioxide is used and, as diluent, a tertiary amine.

4. Process as claimed in claim 1, wherein as dehydrogenating agent tertiary butyl chromate is used and, as diluent, a halogenated hydrocarbon, with the addition of tertiary butanol.

5. Process as claimed in claim 1, wherein the hydrolysis of the ketal radical in 20-position is carried out with perchloric acid in the presence of an aliphatic carboxylic acid of low molecular weight, at a temperature between —20° and +40° C.

6. The 18(21)-cyclohemiacetal of Δ⁴-3:11:18:20-tetraoxo-21-hydroxy-pregnene.

7. The 18(21)-cyclohemiacetal acetate of Δ⁴-3:11:18:20-tetraoxo-21-hydroxy-pregnene.

8. The 18(21)-cyclohemiacetal of Δ⁴-3:11:18-trioxo-20:20-ethylenedioxy-21-hydroxy-pregnene.

9. The 18(21)-cyclohemiacetal acetate of Δ⁴-3:11:18-trioxo-20:20-ethylenedioxy-21-hydroxy-pregnene.

10. 11-oxo-18:21-dihydroxy - 20:20 - alkylenedioxy-pregnene compounds which contain in the 3-position a member selected from the group consisting of a free and a ketalized oxo group, and a 4:5-double bond in a compound with a free 3-keto group and a 5:6-double bond in a compound with a ketalized 3-keto group.

11. Δ⁴-3:11-dioxo - 18:21 - dihydroxy-20:20-ethylenedioxy-pregnene.

12. A member selected from the group consisting of compounds of the general formula

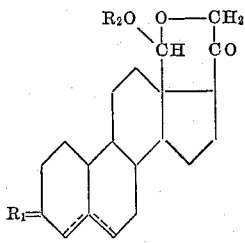

in which $R_1$ is a member selected from the group consisting of a free and a ketalized oxo group, $R_2$ is a member selected from the group consisting of a hydrogen atom and an acyl radical having 1 to 20 carbon atoms, and 20-ketals thereof.

13. A compound as claimed in claim 12, which contains a member selected from the group consisting of a free hydroxyl group, an esterified hydroxyl group and an oxo group in 11-position, a 4:5-double bond in a compound with a free 3-keto group, and a 5:6-double bond in a compound with a ketalized 3-keto group.

14. The 18(21)-cyclohemiacetal of Δ⁵-3:3:20:20-bisethylenedioxy-11:18-dioxo-21-hydroxy-pregnene.

15. The 18(21)-cyclohemiacetal acetate of Δ⁵-3:3:20:20-bisethylenedioxy-11:18-dioxo-21-hydroxy-pregnene.

16. Δ⁵-3:3:20:20 - bisethylenedioxy - 11 - oxo - 18:21-dihydroxypregnene.

No references cited.